(12) United States Patent
Chen et al.

(10) Patent No.: US 9,810,838 B2
(45) Date of Patent: Nov. 7, 2017

(54) FIBER COATINGS WITH LOW YOUNG'S MODULUS AND HIGH TEAR STRENGTH

(71) Applicant: Corning Incorporated, Corning, NY (US)

(72) Inventors: Yangbin Chen, Lima, NY (US); Manuela Ocampo, Corning, NY (US); Ruchi Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 488 days.

(21) Appl. No.: 14/461,685

(22) Filed: Aug. 18, 2014

(65) Prior Publication Data

US 2015/0071595 A1    Mar. 12, 2015

Related U.S. Application Data

(60) Provisional application No. 61/876,918, filed on Sep. 12, 2013.

(51) Int. Cl.

| | |
|---|---|
| *G02B 6/02* | (2006.01) |
| *C08G 18/75* | (2006.01) |
| *C08G 18/48* | (2006.01) |
| *C08G 18/04* | (2006.01) |
| *C09D 175/16* | (2006.01) |
| *G02B 1/14* | (2015.01) |
| *C03C 25/10* | (2006.01) |
| *C08G 18/67* | (2006.01) |

(52) U.S. Cl.
CPC ........ *G02B 6/02395* (2013.01); *C03C 25/106* (2013.01); *C08G 18/04* (2013.01); *C08G 18/4825* (2013.01); *C08G 18/672* (2013.01); *C08G 18/758* (2013.01); *C09D 175/16* (2013.01); *G02B 1/14* (2015.01)

(58) Field of Classification Search
CPC ................ G02B 6/02395; C08G 18/04; C08G 18/4825; C08G 18/672; C08G 18/758
See application file for complete search history.

(56) References Cited

U.S. PATENT DOCUMENTS

| | | | |
|---|---|---|---|
| 4,609,718 | A | 9/1986 | Bishop et al. |
| 4,629,287 | A | 12/1986 | Bishop et al. |
| 4,798,852 | A | 1/1989 | Zimmerman et al. |
| (Continued) | | | |

FOREIGN PATENT DOCUMENTS

| | | |
|---|---|---|
| EP | 1 231 190 | 8/2002 |
| EP | 1 361 240 | 11/2003 |
| (Continued) | | |

*Primary Examiner* — Gerard Higgins
(74) *Attorney, Agent, or Firm* — Kevin L. Bray

(57) ABSTRACT

Fiber coatings with low Young's modulus and high tear strength are realized with coating compositions that include an oligomeric material formed from an isocyanate, a hydroxy acrylate compound and a polyol. The oligomeric material includes a polyether urethane acrylate and a di-adduct compound, where the di-adduct compound is present in an amount of at least 2.35 wt %. The reaction mixture used to form the oligomeric material may include a molar ratio of isocyanate:hydroxy acrylate:polyol of n:m:p, where n may be greater than 3.0, m may be between n−1 and 2n−4, and p may be 2. Young's modulus and tear strength of coatings made from the compositions increase with increasing n. Coatings formed from the present oligomers feature high tear strength for a given Young's modulus.

21 Claims, 5 Drawing Sheets

(56) References Cited

U.S. PATENT DOCUMENTS

| | | | |
|---|---|---|---|
| 4,992,524 | A | 2/1991 | Coady et al. |
| 5,093,386 | A | 3/1992 | Bishop et al. |
| 6,316,516 | B1 | 11/2001 | Chien et al. |
| 6,326,416 | B1 | 12/2001 | Chien et al. |
| 6,359,025 | B1 | 3/2002 | Snowwhite et al. |
| 6,539,152 | B1 | 3/2003 | Fewkes et al. |
| 6,563,996 | B1 | 5/2003 | Winningham |
| 6,916,855 | B2 | 7/2005 | Jansen et al. |
| 7,010,206 | B1 | 3/2006 | Baker et al. |
| 7,067,564 | B2 | 6/2006 | Bulters et al. |
| 7,109,252 | B2 | 9/2006 | Leon et al. |
| 7,706,659 | B2 | 4/2010 | Bulters et al. |
| 7,865,055 | B2 | 1/2011 | Bulters et al. |
| 7,886,612 | B2 | 2/2011 | Bulters et al. |
| 2003/0077059 | A1 | 4/2003 | Chien et al. |
| 2003/0123839 | A1 | 7/2003 | Chou et al. |
| 2010/0058877 | A1 | 3/2010 | Bulters et al. |
| 2010/0158469 | A1 | 6/2010 | Bulters et al. |
| 2013/0196069 | A1 | 8/2013 | Murphy |

FOREIGN PATENT DOCUMENTS

| | | |
|---|---|---|
| EP | 2 091 073 | 8/2009 |
| EP | 2 174 781 | 4/2010 |
| EP | 2 433 973 | 3/2012 |
| WO | 01/05724 | 1/2001 |
| WO | 02/070418 | 9/2002 |
| WO | 2004/031091 | 4/2004 |
| WO | 2011/049607 | 4/2011 |

FIBER COATINGS WITH LOW YOUNG'S MODULUS AND HIGH TEAR STRENGTH

This application claims the benefit of priority under 35 U.S.C. §119 of U.S. Provisional Application Ser. No. 61/876,918 filed on Sep. 12, 2013 the content of which is relied upon and incorporated herein by reference in its entirety.

FIELD OF THE DISCLOSURE

This disclosure pertains to fiber coatings with low Young's modulus and high tear strength. More particularly, this disclosure pertains to oligomers for use in radiation-curable coating compositions that yield fiber coatings with low Young's modulus and high tear strength.

BACKGROUND OF THE DISCLOSURE

The transmissivity of light through an optical fiber is highly dependent on the properties of the coatings applied to the fiber. The coatings typically include a primary coating and a secondary coating, where the secondary coating surrounds the primary coating and the primary coating contacts the glass waveguide (core+cladding) portion of the fiber. The secondary coating is a harder material (higher Young's modulus) than the primary coating and is designed to protect the glass waveguide from damage caused by abrasion or external forces that arise during processing and handling of the fiber. The primary coating is a softer material (low Young's modulus) and is designed to buffer or dissipates stresses that result from forces applied to the outer surface of the secondary coating. Dissipation of stresses within the primary layer attenuates the stress and minimizes the stress that reaches the glass waveguide. The primary coating is especially important in dissipating stresses that arise when the fiber is bent. The bending stresses transmitted to the glass waveguide on the fiber needs to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

To minimize bending losses, it is desirable to develop primary coating materials with increasingly lower Young's moduli. Coating materials with a Young's modulus below 1 MPa are preferred. As the Young's modulus of the primary coating is reduced, however, the primary coating is more susceptible to damage in the fiber manufacturing process or during fiber installation or deployment. Thermal and mechanical stresses that arise during the fiber coating process or during post-manufacture fiber handling and configuration processes (e.g. stripping, cabling and connecting operations) may lead to the formation of defects in the primary coating. The defect formation in the primary coating becomes more problematic as the Young's modulus of the primary coating material decreases. There is a need for a primary coating material that has a low Young's modulus and yet is resistant to stress-induced defect formation during fiber manufacture and handling.

SUMMARY

The present disclosure provides oligomeric materials for use in forming fiber primary coatings. The primary coatings feature low Young's modulus and high tear strength. The primary coatings provide good microbending performance and are resistant to defect formation during fiber coating processing and handling operations.

The oligomeric materials include a polyether urethane acrylate compound and a di-adduct compound. The polyether urethane acrylate compound has the molecular formula:

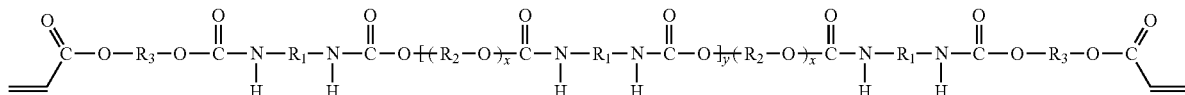

and the di-adduct compound has the molecular formula:

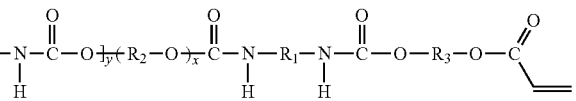

where:
  $R_1$, $R_2$ and $R_3$ are independently selected from linear alkyl groups, branched alkyl groups, or cyclic alkyl groups;
  y is 1, 2, 3, or 4;
  x is between 40 and 100; and
  the di-adduct compound is present in an amount of at least 2.35 wt %.

The oligomeric material may include a polyether urethane acrylate compound having the molecular formula:

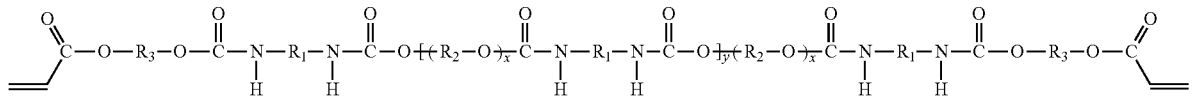

and a di-adduct compound having the molecular formula:

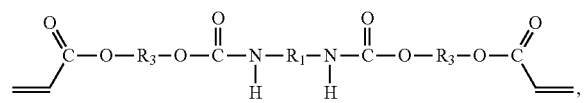

wherein:

$R_1$ is 4,4'-methylenebiscyclohexyl:

$$-\left\langle\!\!\!\bigcirc\!\!\!\right\rangle-(CH_2)-\left\langle\!\!\!\bigcirc\!\!\!\right\rangle-\ ;$$

$R_2$ is propylene:

$$-CH_2-\underset{\underset{CH_3}{|}}{CH}-\ ;$$

$R_3$ is ethylene:

$$-(CH_2)_{\overline{2}}\ ;$$

y is 1;

x is between 50 and 80; and the di-adduct compound is present in an amount of at least 2.35 wt %.

The method of making the oligomeric material may include:

reacting a diisocyanate compound with a hydroxy acrylate compound and a polyol compound;

wherein the diisocyanate compound, the hydroxy acrylate compound and the polyol compound are present in the molar ratio n:m:p, respectively, where n is 3.0 or greater, m is between n−1 and 2n−4, and p is 2.

The method of making the oligomeric material may include:

reacting a diisocyanate compound with a polyol compound;

adding a hydroxy acrylate compound to a product formed from the reaction of the diisocyanate compound and the polyol compound;

wherein the diisocyanate compound, the hydroxy acrylate compound and the polyol compound are present in the molar ratio n:m:p, respectively, where n is 3.0 or greater, m is between n−1 and 2n−4, and p is 2.

The method of making the oligomer may include:

reacting a diisocyanate compound with a hydroxy acrylate compound and a polyol compound; wherein the diisocyanate compound has the molecular formula $$O{=}C{=}N{-}R_1{-}N{=}C{=}O$$

the hydroxy acrylate compound has the molecular formula $$HO-R_3-O-\underset{\underset{\diagdown}{\overset{\overset{O}{\|}}{C}}}{C}$$

and the polyol compound has the molecular formula $$H-O+R_2-O\frac{}{x}H,$$

the reaction forming a reaction composition that includes a polyether urethane acrylate compound having a molecular formula $$\overset{O}{\underset{\diagup}{\|}}C-O-R_3-O-\overset{O}{\underset{\|}{C}}-\underset{H}{N}-R_1-\underset{H}{N}-\overset{O}{\underset{\|}{C}}-O+\!\!(R_2-O)_{\overline{x}}\overset{O}{\underset{\|}{C}}-\underset{H}{N}-R_1-\underset{H}{N}-\overset{O}{\underset{\|}{C}}-O+\!\!_{y}(R_2-O)_{\overline{x}}\overset{O}{\underset{\|}{C}}-\underset{H}{N}-R_1-\underset{H}{N}-\overset{O}{\underset{\|}{C}}-O-R_3-O-\overset{O}{\underset{\diagdown}{\|}}C$$

and a di-adduct compound having the molecular formula:

$$\overset{O}{\underset{\diagup}{\|}}C-O-R_3-O-\overset{O}{\underset{\|}{C}}-\underset{H}{N}-R_1-\underset{H}{N}-\overset{O}{\underset{\|}{C}}-O-R_3-O-\overset{O}{\underset{\diagdown}{\|}}C,$$

wherein $R_1$, $R_2$ and $R_3$ are independently selected from linear alkyl groups, branched alkyl groups, or cyclic alkyl groups;

y is 1, 2, 3, or 4;

x is between 40 and 100; and the di-adduct compound is present in an amount of at least 2.35 wt %; and wherein the diisocyanate compound, the hydroxy acrylate compound and the polyol compound are provided in the molar ratio n:m:p, respectively, where n is 3.0 or greater, m is between n−1 and 2n−4, and p is 2.

The method of making the oligomer may include:

reacting a diisocyanate compound with a hydroxy acrylate compound and a polyol compound in the molar ratio n:n−1:2, said reacting providing a product composition; and adding supplemental hydroxy acrylate compound to the product composition, said supplemental hydroxy acrylate compound being added in an amount sufficient to quench essentially all residual isocyanate groups in the product composition.

The present disclosure further includes fiber coating compositions that include:

one or more monomers with a radiation-curable group;

one or more photoinitiators; and an oligomeric material, the oligomeric material including a polyether urethane acrylate compound and a di-adduct compound, the polyether urethane acrylate compound having the molecular formula:

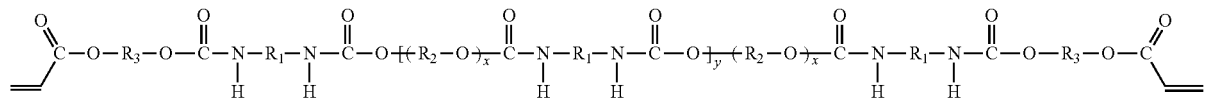

the di-adduct compound having the molecular formula:

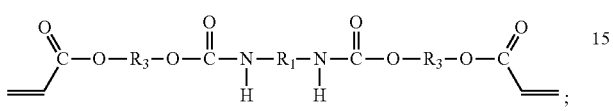

wherein
R$_1$, R$_2$ and R$_3$ are independently selected from linear alkyl groups, branched alkyl groups, or cyclic alkyl groups;
y is 1, 2, 3, or 4; and
x is between 40 and 100; and
the di-adduct compound is present in an amount of at least 2.35 wt %.

The present disclosure further includes fiber coating compositions that include:
one or more monomers with a radiation-curable group;
one or more photoinitiators; and
an oligomeric material, the oligomeric material including a polyether urethane acrylate compound and a di-adduct compound, the polyether urethane acrylate compound having the molecular formula:

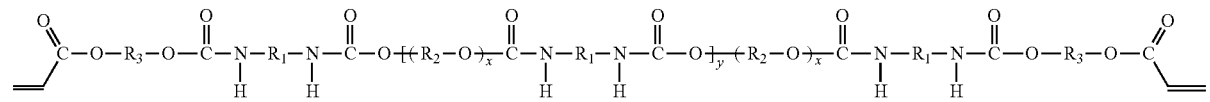

the di-adduct compound having the molecular formula

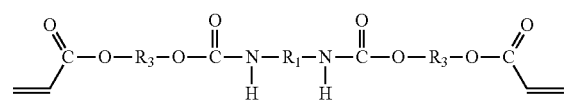

wherein

R$_1$ is 4,4'-methylenebiscyclohexyl:

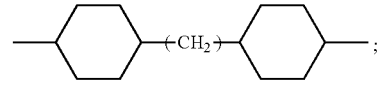

R$_2$ is propylene:

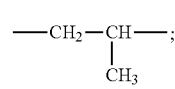

R$_3$ is ethylene:

y is 1;
x is between 50 and 80; and
the di-adduct compound is present in an amount of at least 2.35 wt %.

The present disclosure includes the cured product of a coating composition comprising:

one or more monomers with a radiation-curable group;
an oligomeric material comprising:
a polyether urethane acrylate compound having the molecular formula:

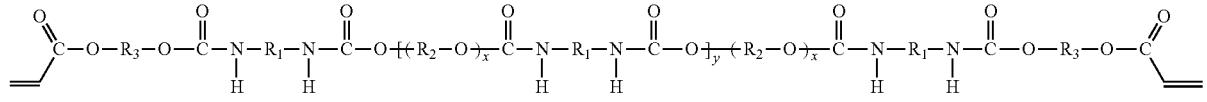

and a di-adduct compound having the molecular formula:

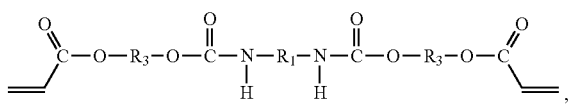

wherein
$R_1$, $R_2$ and $R_3$ are independently selected from linear alkyl groups, branched alkyl groups, or cyclic alkyl groups;
y is 1, 2, 3, or 4;
x is between 40 and 100; and
said di-adduct compound is present in an amount of at least 2.35 wt %;
and a photoinitiator.

The present disclosure further includes fiber coatings formed from the oligomeric materials or coating compositions described herein. The fiber coating features low Young's modulus and high tear strength. Coatings prepared from a coating composition that includes an oligomeric material in accordance with the present disclosure may have a Young Modulus when configured as a film of less than 0.8 MPa, more preferably less than 0.7 MPa and even more preferably less than 0.6 MPa. The coating formed from the oligomer may have a tear strength of greater than 17.5 J/m², more preferably greater than 20 J/m² and even more preferably greater than 26 J/m². Coatings may combine a Young's modulus of less than 1 MPa with a tear strength of at least 15 J/m², or a Young's modulus of less than 0.8 MPa with a tear strength of at least 17.5 J/m², or a Young's modulus of less than 0.8 MPa with a tear strength of at least 20 J/m², or a Young's modulus of less than 0.8 MPa with a tear strength of at least 22.5 J/m², or a Young's modulus of less than 0.8 MPa with a tear strength of at least 24 J/m², or a Young's modulus of less than 0.8 MPa with a tear strength of at least 26 J/m², or a Young's modulus of less than 0.6 MPa with a tear strength of at least 17.5 J/m², or a Young's modulus of less than 0.6 MPa with a tear strength of at least 20 J/m², or a Young's modulus of less than 0.6 MPa with a tear strength of at least 22.5 J/m², or a Young's modulus of less than 0.6 MPa with a tear strength of at least 24 J/m², or a Young's modulus of less than 0.6 MPa with a tear strength of at least 26 J/m², or a Young's modulus of less than 0.5 MPa with a tear strength of at least 15 J/m², or a Young's modulus of less than 0.5 MPa with a tear strength of at least 17.5 J/m², or a Young's modulus of less than 0.5 MPa with a tear strength of at least 20 J/m².

The present disclosure further includes an optical fiber coated with a coating formed from the fiber coating composition made from the oligomeric material, the optical fiber including a glass waveguide, the coating surrounding the glass waveguide, wherein the fiber is able to sustain screening at 200 kpsi and above without forming defects in the coating.

The present disclosure further includes an optical fiber coated with a coating formed from the fiber coating composition made from the oligomeric material, the optical fiber including a glass waveguide, the coating surrounding the glass waveguide, wherein the fiber is able to sustain multiple screening of at least 100 kpsi without forming defects in the coating.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
FIG. 1 is a mass spectrum of a first variant of PPG4000 (Voranol 220-028).

The present disclosure provides primary coatings that exhibit low Young's moduli and high resistance to defect formation during fiber manufacture and handling. The disclosure demonstrates that the resistance of a primary coating to defect formation correlates with the tear strength of the coating. The present disclosure accordingly provides fiber coating compositions and components for fiber compositions that enable formation of fiber coatings that feature a low Young's modulus and high resistance to defect formation.

The present disclosure provides oligomeric materials for radiation-curable coating compositions. The oligomeric materials may be radiation-curable and may have a linear molecular structure. The oligomeric materials may be formed from a reaction between a diisocyanate compound and a polyol compound. The reaction may form a urethane linkage upon reaction of an isocyanate group of the diisocyanate compound and an alcohol group of the polyol. The reaction to form the oligomeric materials may also include inclusion of a hydroxy acrylate compound to quench residual isocyanate groups that may be present in the composition formed from reaction of the diisocyanate compound and polyol compound.

The diisocyanate compound may be represented by molecular formula (I):

$$O=C=N-R_1-N=C=O \qquad (I)$$

which includes two terminal isocyanate groups separated by a linkage group $R_1$. The linkage $R_1$ may include an alkyl linkage. The alkyl linkage may include a linear, branched, or cycloalkyl group. In some embodiments, $R_1$ may be a 4,4'-methylene bis(cyclohexyl) group so that the diisocyanate compound may be 4,4'-methylene bis(cyclohexyl isocyanate).

The polyol may be represented by molecular formula (II):

(II)

where $R_2$ may include an alkyl group. The alkyl group may be a linear, branched, or cycloalkyl group. The polyol may be a polyalkylene oxide, such as polyethylene oxide, or a polyalkylene glycol, such as polypropylene glycol. The index x represents the number of repeat units in the polyol. The index x may be at least 40, or at least 50, or at least 60, or at least 70, or at least 80, or at least 90, or at least 100, or between 40 and 100, or between 50 and 90, or between 60 and 80, or about 70. When $R_2$ is propylene, for example, the polyol may have a number average molecular weight of about 2000 g/mol, or about 3000 g/mol, or about 4000 g/mol, or about 5000 g/mol. The polyol may be polydisperse and may include molecules spanning a range of molecular weights such that the totality of molecules combine to provide the number average molecular weight specified hereinabove.

The reaction may further include addition of a hydroxy acrylate compound to react with terminal isocyanate groups present in unreacted starting materials (e.g. the diisocyanate compound) or products formed in the reaction of the diisocyanate compound with the polyol (e.g. polyether urethane acrylate compound or di-adduct compound). The hydroxy acrylate compound may react with terminal diisocyanate groups to provide terminal acrylate groups for one or more constituents of the oligomeric material. The hydroxy acrylate compound may be present in excess of the amount needed to fully convert terminal isocyanate groups to terminal acrylate groups.

The hydroxy acrylate compound may be represented by molecular formula (III):

(III)

where $R_3$ may include an alkyl group, where the alkyl group be a linear, branched, or cycloalkyl group. The hydroxy acrylate compound may be a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. The water content of the hydroxy acrylate compound may be at least 300 ppm, or at least 600 ppm, or at least 1000 ppm, or at least 1500 ppm, or at least 2000 ppm, or at least 2500 ppm.

The oligomeric material may be formed by first reacting the diisocyanate compound with hydroxy acrylate compound, followed by the reaction with the polyol. The oligomeric material may also be formed by first reacting the diisocyanate compound with the polyol compound and then reacting the resulting reaction composition with the hydroxy acrylate compound.

In the foregoing exemplary molecular formulas, the groups $R_1$, $R_2$, and $R_3$ may all be the same, may all be different, or may include two groups that are the same and one group that is different.

The oligomeric material may be formed from a reaction of a diisocyanate compound, a hydroxy acrylate compound, and a polyol, where the molar ratio of the diisocyanate compound to the hydroxy acrylate compound to the polyol in the reaction process is n:m:p. The diisocyanate compound, hydroxy acrylate compound and polyol may be combined simultaneously and reacted or may be combined sequentially and reacted. The diisocyanate compound and polyol compound may be combined and reacted and thereafter the hydroxy acrylate compound may be added to the reaction composition. n, m, and p may be referred to herein as molar ratios (or mole ratios) of diisocyanate, hydroxy acrylate, and polyol; respectively. The molar ratios n, m and p are integer or non-integer numbers. m is between n−1 and 2n−4, and p is 2. The diisocyanate compound molar ratio n may be greater than 3.0, or greater than 3.2, or greater than 3.5 or greater larger than 3.7. The diisocyanate compound molar ratio n may be less than 4.5, or less than 4.2 or less than 4. n may be between 3.0 and 4.5, or between 3.0 and 4.2, or between 3.5 and 4.2, or between 3.2 and 4.0. m may be selected to stoichiometrically react with isocyanate groups present on the constituents of the oligomeric material or unreacted diisocyanate compound. m may be selected to provide an amount of the hydroxy acrylate compound in excess of the amount needed to stoichiometrically react with any unreacted isocyanate groups present in the reaction composition.

The oligomeric material may be formed by reacting a diisocyanate compound with a hydroxy acrylate compound and a polyol compound, wherein the diisocyanate compound, the hydroxy acrylate compound and the polyol compound are reacted initially in the molar ratio n:n−1:2. Supplemental hydroxy acrylate compound may be added beyond the molar ratio of n−1. The supplemental hydroxy acrylate compound may partially or essentially completely quench residual isocyanate groups that may be present in the composition formed from the reaction of the initial amounts of diisocyanate compound, hydroxy acrylate compound, and polyol compound. The constituents of the oligomeric material may be essentially free of residual isocyanate groups. As used herein, the term "quench" refers to conversion of isocyanate groups through a chemical reaction with hydroxyl groups. As is known in the art, isocyanate groups tend to react slowly over time. Slow reaction of isocyanate groups leads to instability of coating formulations that include isocyanate compound. The composition, reactivity, and properties of the coating formulation varies as reactions of isocyanate groups occur over time. Quenching of isocyanate groups may improve the stability of the reaction composition or reaction products.

The oligomeric material may be formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol may have a molecular weight between 3000 g/mol and 5000 g/mol, or about 4000 g/mol.

The oligomeric material includes at least two components. The first component may have the molecular formula (IV):

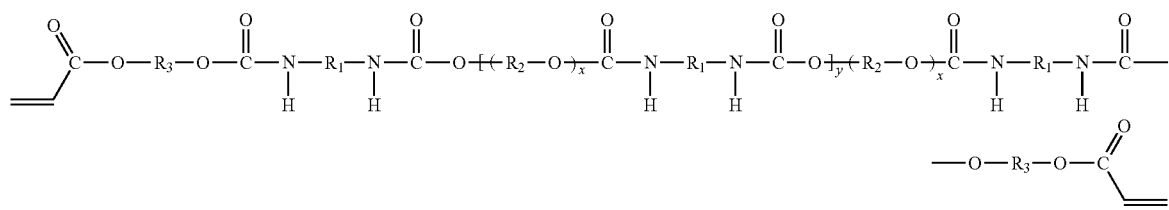

(IV)

and the second component may have the molecular formula (V):

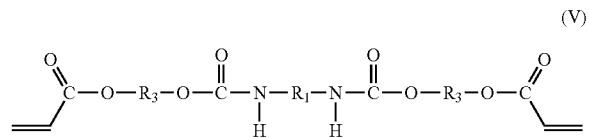

(V)

where the groups $R_1$ and $R_3$ are as described hereinabove. The first component may be referred to herein as a polyether urethane acrylate compound. The second component is a diacrylate compound and may be referred to herein as a di-adduct or di-adduct compound. The di-adduct compound may be formed from a reaction of the diisocyanate compound with the hydroxy acrylate compound. The hydroxy group of the hydroxy acrylate compound may react with an isocyanate group of the diisocyanate compound to provide a terminal acrylate group. The reaction may occur at each isocyanate group of the diisocyanate compound to form the di-adduct compound. The di-adduct compound may be present in the final reaction mixture in an amount of at least 2.35 wt %, or at least 2.4 wt %, or at least 2.6 wt %, or at least 2.9 wt %, or at least 3.2 wt %. The di-adduct compound weight % in the finally-synthesized oligomeric material in certain embodiments is larger than 2.35%, In other embodiments, the di-adduct compound weight % in the finally-synthesized oligomeric material is larger than 2.6%, In still other embodiments, the di-adduct compound weight % in the finally-synthesized oligomeric material is larger than 2.9%.

An illustrative reaction for synthesizing an oligomeric material in accordance with the present disclosure includes reaction of a diisocyanate compound (4,4'-methylene bis (cyclohexyl isocyanate, which may also be referred to herein as H12MDI) and a polyol (polypropylene glycol with $M_n$~4000 g/mol, which may also be referred to herein as PPG4000) to form a polyether urethane isocyanate compound:

H12MDI~PPG4000~H12MDI~PPG4000~H12MDI where "~" denotes a urethane linkage formed by the reaction of an isocyanate group of H12MDI and an alcohol group of PPG4000 and ~H12MDI, ~H12MDI~, and ~PPG4000~ refer to residues of H12MDI and PPG4000 remaining after the reaction. The polyether urethane isocyanate compound has a repeat unit of the type ~(H12MDI~PPG4000)~. The particular polyether urethane isocyanate shown includes two PPG4000 units. The reaction may also include products having one PPG4000 unit, or three or more PPG4000 units. The polyether urethane isocyanate and any unreacted H12MDI include terminal isocyanate groups. In accordance with the present disclosure, a hydroxy acrylate compound (such as 2-hydroxyethyl acrylate, which may also be referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane isocyanate compound may form the polyether urethane acrylate compound:

HEA~H12MDI~PPG4000~H12MDI~PPG4000~
H12MDI and reaction of HEA with unreacted H12MDI may form the di-adduct compound:

HEA~H12MDI~HEA where, as above, ~ designates a urethane linkage and ~HEA designates the residue of HEA remaining after reaction to form the urethane linkage. The combination of the polyether urethane acrylate compound and di-adduct compound in the product composition constitutes an oligomeric material in accordance with the present disclosure. As described more fully hereinbelow, such oligomeric materials may be used in coating compositions to make coatings that have improved tear strength characteristics. In particular, it is demonstrated that oligomeric materials having a high proportion of di-adduct compound may provide coatings with particularly high tear strengths.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomeric material formed from the general reaction may include a first component that includes a polyether urethane acrylate compound of the type:

(hydroxy acrylate)~(diisocyanate~polyol)$_x$~diisocyanate~(hydroxy acrylate)

and a second component that includes a di-adduct compound of the type:

(hydroxy acrylate)~diisocyanate~(hydroxy acrylate)

where the relative proportions of diisocyanate compound, hydroxy acrylate compound, and polyol used in the reaction to form the oligomer correspond to n, m, and p as disclosed hereinabove.

Compounds represented by molecular formulas (I) and (II) above, for example, may react to form a polyether urethane isocyanate compound represented by molecular formula (VI):

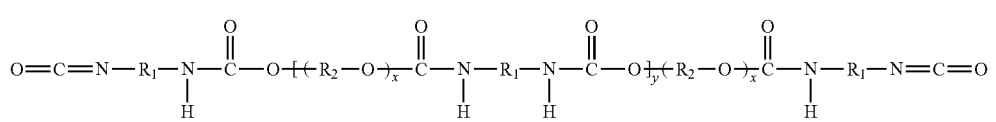

(VI)

where y may be 1, or 2, or 3 or 4; and x is determined by the number of repeat units of the polyol (as described hereinabove).

Further reaction of the polyether urethane isocyanate of molecular formula (VI) with the hydroxy acrylate of molecular formula (III) provides the polyether urethane acrylate compound represented by molecular formula (IV) referred to hereinabove and repeated below:

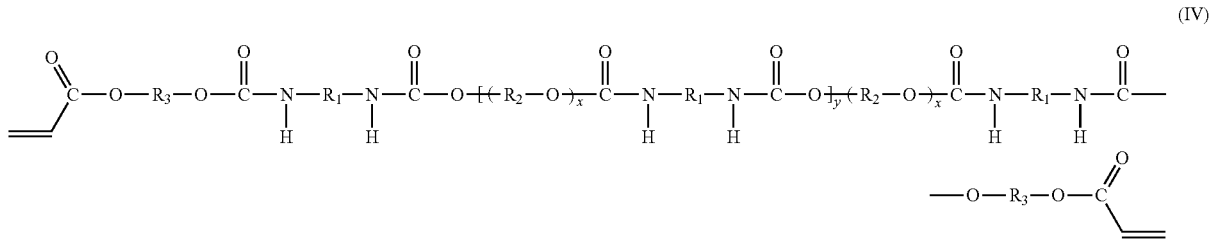

(IV)

where y may be 1, or 2, or 3, or 4; and x is determined by the number of repeat units of the polyol (as described hereinabove).

The reaction between the diisocyanate compound, hydroxy acrylate compound, and polyol may yield a series of polyether urethane acrylate compounds that differ in y such that the average value of y over the distribution of compounds present in the final reaction mixture may be a non-integer. The average value of y in the polyether urethane isocyanates and polyether urethane acrylates of molecular formulas (VI) and (IV) may correspond to p or p−1 (where p is as defined hereinabove). The average number of occurrences of the group $R_1$ in the polyether urethane isocyanates and polyether urethane acrylates of the molecular formulas (VI) and (IV) may correspond to n (where n is as defined hereinabove).

The di-adduct compound may be present in the oligomeric material in an amount of at least 2.35 wt %, or at least 2.4 wt %, or at least 2.6 wt %, or at least 2.9 wt %, or at least 3.2 wt %, or at least 3.5 wt %.

The relative proportions of the polyether urethane acrylate and di-adduct compounds produced in the reaction may be controlled by varying the molar ratios n, m, and p. By way of illustration, the case where p=2 may be considered. In the theoretical limit of complete reaction, two equivalents p of polyol would react with three equivalents n of a diisocyanate to form a compound having molecular formula (VI) in which y=1. The compound includes two terminal isocyanate groups, which can be quenched with two equivalents m of a hydroxy acrylate compound in the theoretical limit to form the corresponding polyether urethane acrylate compound (IV). A theoretical molar ratio n:m:p=3:2:2 may be defined for this situation.

In the foregoing exemplary theoretical limit, a reaction of diisocyanate, hydroxy acrylate, and polyol in the theoretical molar ratio n:m:p=3:2:2 provides a polyether urethane acrylate compound having molecular formula (IV) in which y=1 without forming a di-adduct compound. Variations in the molar ratios n, m, and p provide control over the relative proportions of polyether urethane acrylate and di-adduct formed in the reaction. Increasing the molar ratio n relative to the molar ratio m or the molar ratio p, for example, may increase the amount of di-adduct compound formed in the reaction. Reaction of the diisocyanate compound, the hydroxy acrylate compound, and polyol compound in molar ratios n:m:p, where n>3, m is between n−1 and 2n−4, and p is 2, for example, may produce amounts of the di-adduct compound in the oligomeric material sufficient to achieve the beneficial coating properties described hereinbelow.

The present disclosers have discovered that variations in the relative proportions of di-adduct and polyether urethane acrylate obtained through changes in the molar ratios n, m, and p make it possible to precisely control the tear strength and other mechanical properties of coatings formed from the oligomeric material. Coarse or discrete control over properties is achievable in prior art formulations by varying the number of units of polyol in the polyether urethane acrylate compound (e.g. p=2 vs. p=3 vs. p=4). The methods of the present disclosure, in contrast, permit fine or more nearly continuous control of tear strength and other mechanical properties in coatings formed from oligomeric materials that include a polyether urethane acrylate compound with a fixed number of polyol units (e.g. p=2) and variable amounts of di-adduct compound. For a polyether urethane compound with a given number of polyol units, oligomeric materials having variable proportions of di-adduct compound can be prepared. The variability in proportion of di-adduct compound can be finely controlled to provide oligomeric materials based on a polyether urethane compound with a fixed number of polyol units that provide coatings that offer precise or targeted values of tear strength or other mechanical properties.

The present disclosers have discovered that improved fiber coatings result when utilizing a coating composition that incorporates an oligomeric material that includes a polyether urethane acrylate compound represented by molecular formula (IV) and a di-adduct compound represented by molecular formula (V), where concentration of the di-adduct compound in the oligomeric material is at least 2.35 wt %. The concentration of the di-adduct compound may be increased by varying the molar ratios n:m:p of diisocyanate:hydroxy acrylate:polyol. In accordance with the present disclosures, molar ratios n:m:p that are rich in diisocyanate relative to polyol promote the formation of the di-adduct compound diacrylate.

In the exemplary theoretical limit n:m:p=3:2:2 described hereinabove, the reaction proceeds with p equivalents of polyol, n=p+1 equivalents of diisocyanate, and two equivalents of hydroxy acrylate. If the mole ratio n exceeds p+1, the diisocyanate compound is present in excess relative to the amount of polyol compound needed to form the polyether urethane acrylate of molecular formula (IV). The presence of excess diisocyanate shifts the distribution of reaction products toward enhanced formation of the di-adduct compound.

In order to form di-adduct compound from excess diisocyanate compound, it is also necessary to increase the amount of hydroxy acrylate. For each equivalent of diisocyanate above the theoretical molar ratio n=p+1, two equivalents of hydroxy acrylate are needed to form the di-adduct compound. In the case of arbitrary molar ratio p (polyol), the theoretical molar ratios n (diisocyanate) and m (hydroxy acrylate) are p+1 and 2, respectively. As the mole ratio n is increased above the theoretical value, the theoretical equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (V)) and the term 2[n−(p+1)] represents the equivalents of hydroxy acrylate needed to convert the excess starting diisocyanate to the di-adduct compound. If the actual value of the mole ratio m is less than the theoretical number of equivalents, the available hydroxy acrylate may react with isocyanate groups present on the oligomer or free diisocyanate molecules to form terminal acrylate groups. The relative kinetics of the two reaction pathways dictates the relative amounts of polyether urethane acrylate and di-adduct compounds formed and the deficit in hydroxy acrylate relative to the theoretical amount may be controlled to further influence the relative proportions of polyether urethane acrylate and di-adduct formed in the reaction. The reaction may further include heating the reaction composition formed from the diisocyanate compound, hydroxy acrylate compound, and polyol. The heating may facilitate conversion of terminal isocyanate groups to terminal acrylate groups through a reaction of the hydroxy acrylate compound with terminal isocyanate groups. The hydroxy acrylate compound may be present in excess in the initial reaction mixture and/or may otherwise be available or added in unreacted form to effect conversion of terminal isocyanate groups to terminal acrylate groups. The heating may occur at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

Conversion of terminal isocyanate groups on the polyether urethane acrylate compound or starting diisocyanate compound (unreacted initial amount or amount present in excess) to terminal acrylate groups may also be facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane acrylate compound and di-adduct compound. As described hereinabove, once the reaction has proceeded to completion or other desired endpoint, it may be desirable to quench (neutralize) residual isocyanate groups to provide a stabilized reaction product. Supplemental hydroxy acrylate may be added to accomplish this objective. The amount of supplemental hydroxy acrylate compound may be in addition to the amount included in the initial reaction process. The presence of terminal isocyanate groups at any stage of the reaction may be monitored, for example, by FTIR spectroscopy (e.g. using a characteristic isocyanate stretching mode near 2265 $cm^{-1}$) and supplemental hydroxy acrylate compound may be added as needed until the intensity of the characteristic stretching mode of isocyanate groups is negligible or below a pre-determined threshold. Supplemental hydroxy acrylate compound may be added beyond the amount needed to fully convert terminal isocyanate groups to terminal acrylate groups. Supplemental hydroxy acrylate compound may be included in the initial reaction mixture (as an amount above the theoretical amount expected from the molar ratios of diisocyanate and polyol), added as the reaction progresses, or added after reaction of the diisocyanate and polyol compounds has occurred to completion or pre-determined extent.

Amounts of hydroxy acrylate compound above the amount needed to fully convert isocyanate groups may be referred to herein as excess amounts of hydroxy acrylate compound. The excess amount of hydroxy acrylate compound may be at least 20% of the amount of supplemental hydroxy acrylate compound needed to fully convert terminal isocyanate groups to terminal acrylate groups, or at least 40% of the amount of supplemental hydroxy acrylate compound needed to fully convert terminal isocyanate groups to terminal acrylate groups, or at least 60% of the amount of supplemental hydroxy acrylate compound needed to fully convert terminal isocyanate groups to terminal acrylate groups, or at least 90% of the amount of supplemental hydroxy acrylate compound needed to fully convert terminal isocyanate groups to terminal acrylate groups.

The amount of supplemental hydroxy acrylate compound may be sufficient to completely or nearly completely quench residual isocyanate groups present in the oligomeric material formed in the reaction. Quenching of isocyanate groups is desirable because isocyanate groups are relatively unstable and may undergo reaction over time. Such reaction may alter the characteristics of the reaction composition or oligomeric material and may lead to inconsistencies in coatings formed therefrom. Reaction compositions and products formed from the starting diisocyanate and polyol compounds that are free of residual isocyanate groups are expected to have greater stability and predictability of characteristics.

The oligomeric material of the present disclosure may be included in a coating composition from which a coating may be prepared. The coating may be a primary coating. The coating composition may be radiation curable. In addition to the oligomeric material, the coating composition may include monomers, a polymerization initiator, and one or more additives.

Unless otherwise specified or implied herein, the weight percent (wt %) of a particular component in the coating composition refers to the amount of the component present in the curable primary composition on an additive-free basis. Generally, the weight percents of the monomer(s), oligomer(s) or oligomeric material(s), and initiator(s) sum to 100%. When present, the amount of an additive is reported herein in units of parts per hundred (pph) relative to the combined amounts of monomer(s), oligomer(s) or oligomeric material(s), and initiator(s). An additive present at the 1 pph level, for example, is present in an amount of 1 g for every 100 g of combined monomer(s), oligomer(s) or oligomeric material(s), and initiator(s).

The oligomeric component of the coating composition may be an oligomeric material in accordance with the present disclosure. The oligomeric material may include a polyether urethane acrylate compound and di-adduct compound as described hereinabove, where the di-adduct compound is present in the oligomeric material in an amount of at least 2.35 wt %. The oligomeric component may optionally include one or more additional oligomer compounds. The additional oligomer compounds may include a urethane acrylate oligomer, or a urethane acrylate oligomer that includes one or more aliphatic urethane groups, or a urethane acrylate oligomer that includes a single urethane group, or a urethane acrylate oligomer that includes a single aliphatic urethane group. The urethane group may be formed from a reaction between an isocyanate group and an alcohol group.

The additional oligomer compounds may include an acrylate-terminated oligomer. Illustrative acrylate-terminated oligomers include BR3731, BR3741, BR582 and KWS4131, (available from Dymax Oligomers & Coatings); polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein.

The additional oligomer compound may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. These oligomers may have flexible backbones, low polydispersities, and/or may provide cured coatings of low crosslink densities.

The total oligomer content of the coating composition may be between about 5 wt % and about 95 wt %, or between about 25 wt % and about 65 wt %, or between about 35 wt % and about 55 wt %. The entirety of the oligomeric component of the coating composition may include an oligomeric material in accordance with the present disclosure. The oligomeric component of the coating composition may optionally include one or more oligomers in addition to an oligomeric material in accordance with the present disclosure.

The monomer component of the coating composition may be selected to be compatible with the oligomer, to provide a low viscosity formulation, and/or to influence the refractive index of the coating. The monomer may also be selected to provide curable compositions having decreased gel times and low Young's moduli. The coating composition may include a single monomer or a combination of monomers.

The monomers may include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

The monomer component of the coating composition may include compounds having the general formula $R_2-R_1-O-(CH_2CH_3CH-O)_q-COCH=CH_2$, where $R_1$ and $R_2$ are aliphatic, aromatic, or a mixture of both, and q=1 to 10, or $R_1-O-(CH_2CH_3CH-O)_q-COCH=CH_2$, where $R_1$ is aliphatic or aromatic, and q=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxyl)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the coating composition may also include a multifunctional (meth)acrylate. As used herein, the term "(meth)acrylate" means acrylate or methacrylate. Multifunctional (meth)acrylates are (meth)acrylates having two or more polymerizable (meth)acrylate moieties per molecule. The multifunctional (meth)acrylate may have three or more polymerizable (meth)acrylate moieties per molecule. Examples of multifunctional (meth) acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. A multifunctional (meth)acrylate may be present in the primary curable composition at a concentration of from 0.05-15 wt %, or from 0.1-10 wt %.

The monomer component of the coating compositions may include an N-vinyl amide such as an N-vinyl lactam, or N-vinyl pyrrolidinone, or N-vinyl caprolactam. The N-vinyl amide monomer may be present at a concentration from 0.1-40 wt %, or from 2-10 wt %.

The coating composition may include one or more monofunctional (meth)acrylate monomers in an amount from 5-95 wt %, or from 30-75 wt %, or from 40-65 wt %. The coating composition may include one or more monofunctional aliphatic epoxy acrylate monomers in an amount from 5-40 wt %, or from 10-30 wt %.

The monomer component of the coating composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl(meth)acrylate, 3-hydroxypropyl(meth)acrylate, and 4-hydroxybutyl(meth)acrylate (each available from Aldrich).

The hydroxyfunctional monomer may be present in an amount sufficient to improve adhesion of the coating to the optical fiber. The hydroxyfunctional monomer may be present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

The total monomer content of the coating composition may be between about 5 wt % and about 95 wt %, or between about 30 wt % and about 75 wt %, or between about 40 wt % and about 65 wt %.

The coating composition may include an N-vinyl amide monomer at a concentration of 0.1 to 40 wt % or 2 to 10 wt % in combination with an oligomeric material in accordance with the present disclosure in an amount from 5 to 95 wt %, or from 25 to 65 wt % or from 35 to 55 wt %.

The coating composition may include one or more monofunctional (meth)acrylate monomers in an amount of from about 5 to 95 wt %; an N-vinyl amide monomer in an amount of from about 0.1 to 40 wt %; and an oligomeric material in accordance with the present disclosure in an amount of from about 5 to 95 wt %.

The coating composition may include one or more monofunctional (meth)acrylate monomers in an amount of from about 40 to 65% by weight; an N-vinyl amide monomer in an amount of from about 2 to 10% by weight; and an oligomeric material in accordance with the present disclosure in an amount of from about 35 to 60% by weight.

The coating composition may also include polymerization initiators, antioxidants, and other additives familiar to the skilled artisan.

The polymerization initiator may facilitate initiation of the polymerization process associated with the curing of the coating composition to form the coating. Polymerization initiators may include thermal initiators, chemical initiators, electron beam initiators, and photoinitiators. Photoinitiators such as ketonic photoinitiating additives and/or phosphine oxide additives may be employed. When used in the photoformation of the coating of the present disclosure, the photoinitiator may be present in an amount sufficient to enable rapid ultraviolet curing.

Suitable photoinitiators may include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The photoinitiator component of the coating composition may consist of a single photoinitiator or a combination of two or more photoinitiators. The total photoinitiator content of the coating composition may be up to about 10 wt %, or between about 0.5 wt % and about 6 wt %.

In addition to monomer(s), oligomer(s) and/or oligomeric material(s), and polymerization initiator(s), the coating composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, the disclosures of which are hereby incorporated by reference herein.

It may be desirable to include an adhesion promoter in the coating composition. An adhesion promoter is a compound that may facilitate adhesion of the primary coating and/or primary composition to the cladding. Suitable adhesion promoters include alkoxysilanes, organotitanates, and zirconates. Representative adhesion promoters include 3-mercaptopropyl-trialkoxysilane (e.g., 3-MPTMS, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter may be present in the coating composition in an amount between about 0.02 pph to about 10 pph, or between about 0.05 pph and 4 pph, or between about 0.1 pph to about 2 pph, or between about 0.1 pph to about 1 pph.

The coating composition may also include a strength additive, as described in U.S. Published Patent Application No. 20030077059, the disclosure of which is hereby incorporated by reference herein in its entirety. Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl)trimethoxysilane, and dodecyl mercaptan. The strength additive may be present in the coating composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl)propionate] (e.g., IRGANOX 1035, available from BASF).

It may be desirable to include an optical brightener in the coating composition. Representative optical brighteners include TINOPAL OB (available from BASF); Blankophor KLA (available from Bayer); bisbenzoxazole compounds; phenylcoumarin compounds; and bis(styryl)biphenyl compounds. The optical brightener may be present in the coating composition at a concentration of 0.005 pph-0.3 pph.

It may also be desirable to include an amine synergist in the coating composition. Representative amine synergists include triethanolamine; 1,4-diazabicyclo[2.2.2]octane (DABCO), triethylamine, and methyldiethanolamine. The amine synergist may be present at a concentration of 0.02 pph-0.5 pph.

Curing of the coating composition provides a fiber coating with increased resistance to defect formation during the fiber manufacture process or subsequent fiber processing or handling. As will be described in greater detail hereinbelow, the present disclosure demonstrates that coatings having high tear strength are more resistant to defect formation during fiber processing and handling. Although coatings with high tear strength have been described in the prior art, such coatings also exhibit a high Young's modulus and fail to provide the superior microbending performance of the present coatings. The coatings of the present disclosure, in contrast, combine a low Young's modulus with high tear strength and are well suited for applications as primary fiber coatings.

Coatings prepared from a coating composition that includes an oligomeric material in accordance with the present disclosure may have a Young's modulus of less than 1 MPa, or less than 0.8 MPa, or less than 0.7 MPa, or less than 0.6 MPa, or less than 0.5 MPa.

Coatings prepared from a coating composition that includes an oligomeric material in accordance with the present disclosure may have a tear strength of at least 17.5 $J/m^2$, or at least 20 $J/m^2$, or at least 22 $J/m^2$, or at least 24 $J/m^2$, or at least 26 $J/m^2$, or at least 28 $J/m^2$.

Coatings prepared from a coating composition that includes an oligomeric material in accordance with the present disclosure may combine a Young's modulus of less than 1 MPa with a tear strength of at least 17.5 $J/m^2$, or a Young's modulus of less than 0.8 MPa with a tear strength of at least 20 $J/m^2$, or a Young's modulus of less than 0.8 MPa with a tear strength of at least 22 $J/m^2$, or a Young's modulus of less than 0.8 MPa with a tear strength of at least 24 $J/m^2$, or a Young's modulus of less than 0.8 MPa with a tear strength of at least 26 $J/m^2$, or a Young's modulus of less than 0.8 MPa with a tear strength of at least 28 $J/m^2$, or a Young's modulus of less than 0.7 MPa with a tear strength of at least 20 $J/m^2$, or a Young's modulus of less than 0.7 MPa with a tear strength of at least 22 $J/m^2$, or a Young's modulus of less than 0.7 MPa with a tear strength of at least 24 $J/m^2$, or a Young's modulus of less than 0.7 MPa with a tear strength of at least 26 $J/m^2$, or a Young's modulus of less than 0.7 MPa with a tear strength of at least 28 $J/m^2$, or a Young's modulus of less than 0.6 MPa with a tear strength of at least 17.5 $J/m^2$, or a Young's modulus of less than 0.6 MPa with a tear strength of at least 20 $J/m^2$, or a Young's modulus of less than 0.6 MPa with a tear strength of at least 22 $J/m^2$, or a Young's modulus of less than 0.6 MPa with a tear strength of at least 24 $J/m^2$, or a Young's modulus of less than 0.6 MPa with a tear strength of at least 26 $J/m^2$, or a Young's modulus of less than 0.5 MPa with a tear strength of at least 17.5 $J/m^2$, or a Young's modulus of less than 0.5 MPa with a tear strength of at least 20 $J/m^2$, or a Young's modulus of less than 0.5 MPa with a tear strength of at least 24 $J/m^2$.

The present disclosure extends to optical fibers coated with the cured product of coating compositions that include the present oligomeric materials. The optical fiber may include a glass waveguide. A coating formed as a cured product of the present coating compositions may surround the glass waveguide. The cured product of the present coating compositions may function as the primary coating of the fiber. The fiber may include a secondary coating. The fiber may withstand screening at a level of at least 200 kpsi without forming defects in the coating formed as the cured product of the present coating composition. The fiber may withstand two or more screenings at a level of at least 100 kpsi without forming defects in the coating formed as the cured product of the present coating composition.

Examples

Several coatings prepared from coating compositions that included an oligomeric material in accordance with the present disclosure were tested. The tests included measurements of Young's modulus and tear strength. The components of the coating compositions, processing conditions, test methodologies, and test results are described hereinbelow.

Figure 2:
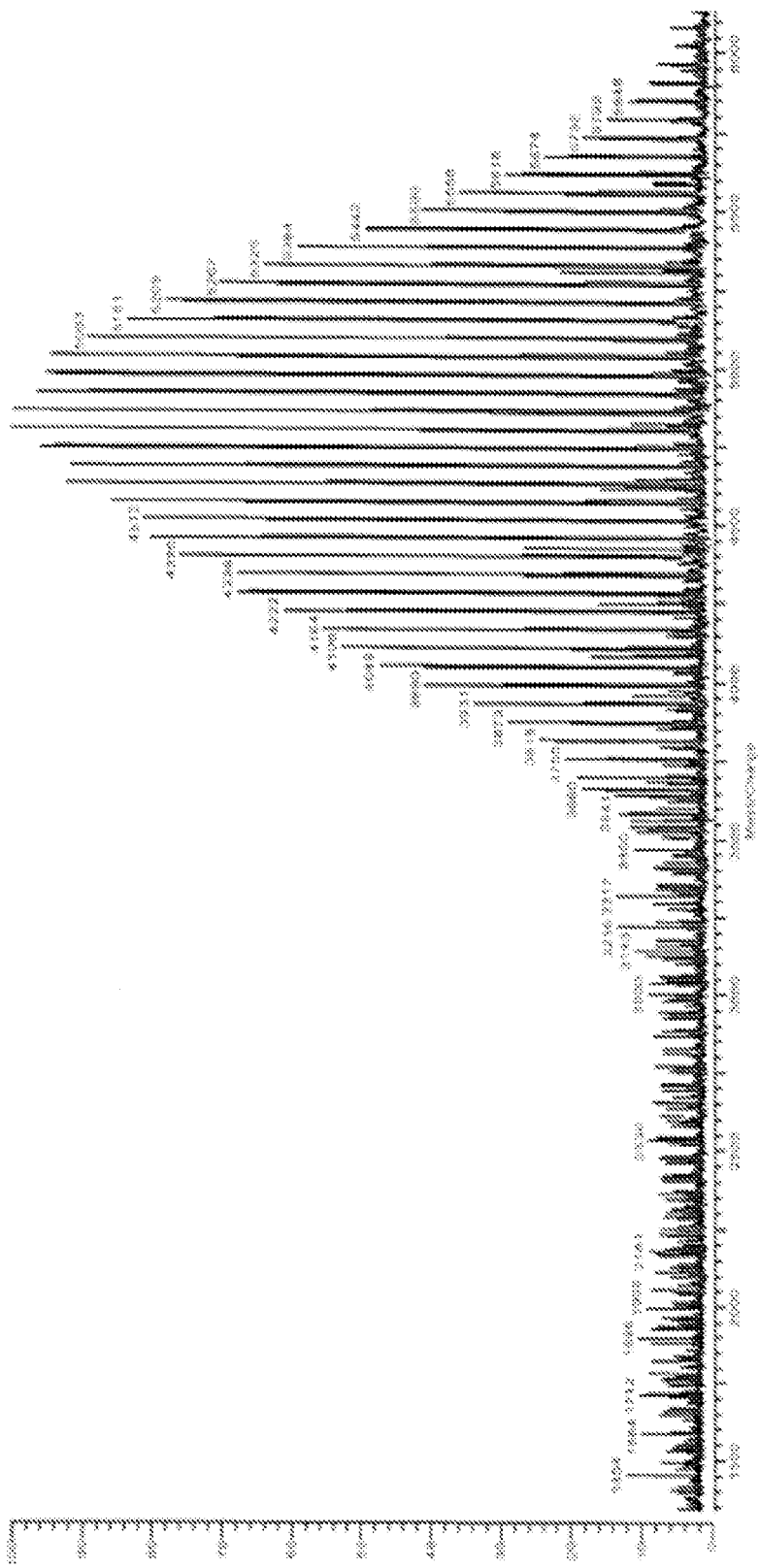
FIG. 2 is a mass spectrum of a second variant of PPG4000 (Polyglycol P4000).
Figure 3:
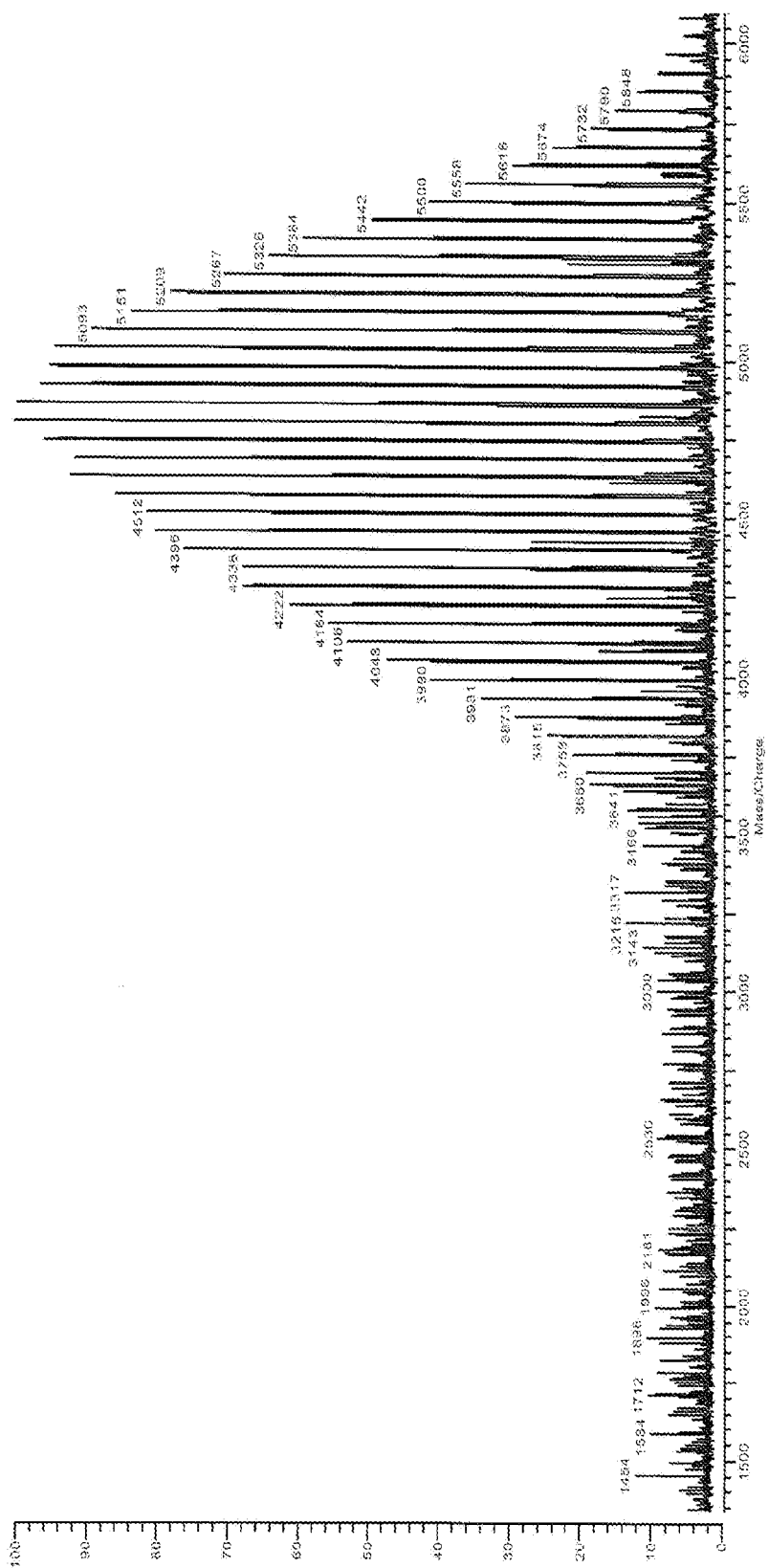
FIG. 3 is a mass spectrum of a third variant of PPG4000 (Aldrich).

The exemplary oligomeric materials were prepared from H12MDI (4,4'-methylene bis(cyclohexyl isocyanate), PPG4000 (polypropylene glycol with $M_n$~4000 g/mol) and HEA (2-hydroxyethyl acrylate) in accordance with the illustrative reaction described hereinabove. All reagents were used as supplied by the manufacturer and were not subjected to further purification. H12MDI was obtained from Aldrich or Bayer. Three variants of PPG4000 were employed in the synthesis of sample oligomers. Variant 1 (Voranol 220-028, available from Dow) included a greater amount of low molecular weight material. Variant 2 (Polyglycol P4000, available from Dow) and Variant 3 (Product No. 202355, available from Aldrich) included lesser amounts of low molecular weight material. The molecular weights of the three variant of PPG4000 were determined by measuring the hydroxyl number. The mass spectra of the three variants of PPG4000 are shown in FIGS. 1-3.

Three variants of HEA were also employed. The variants differed in water content. The following table summarizes the source of HEA and the water content:

| HEA Source | Water Content (ppm) |
|---|---|
| Aldrich | 345 |
| BASF | 300 |
| Kowa | 2500 |

The relative amounts, characteristics of the reactants, and reaction conditions were varied to obtain a series of twelve oligomeric materials. Oligomeric materials with different initial molar ratios of the constituents were prepared with molar ratios of the reactants satisfying H12MDI:HEA:PPG4000=n:n−1:2, where n was between 3.1 and 4.5. In the formation of some of the oligomeric materials, supplemental HEA was added to the reaction mixture to quench residual isocyanate groups that may have remained unreacted. The supplemental HEA was an amount in addition to the amount corresponding to the initial molar ratio n−1. In the reactions, dibutyltin dilaurate was used as a catalyst (at a level of 160 ppm based on the mass of the initial reaction mixture) and 2,6-di-tert-butyl-4-methylphenol was used as an inhibitor (at a level of 400 ppm based on the mass of the initial reaction mixture).

The amounts of the reactants used to prepare each of the twelve oligomer samples are summarized in Table 1 below. The corresponding actual mole ratios are listed in Table 2 below. The mole ratios are normalized to set the mole ratio of PPG4000 to 2. Table 2 also lists the theoretical mole ratio of HEA, which was determined by computing 2+2 (n−3).

TABLE 1

Reactants and Amounts for Exemplary Oligomeric Materials 1-12

| Sample | H12MDI (g) | HEA (g) | HEA Water Content (ppm) | PPG4000 Variant | PPG4000 (g) |
|---|---|---|---|---|---|
| 1 | 24.3 | 7.6 | 345 | 3 | 220.2 |
| 2 | 25.4 | 8.2 | 345 | 3 | 220.2 |
| 3 | 25.9 | 8.5 | 345 | 3 | 215.6 |
| 4 | 26.8 | 8.9 | 345 | 3 | 241.4 |
| 5 | 24.3 | 7.6 | 345 | 3 | 220.2 |
| 6 | 24.6 | 7.8 | 2500 | 1 | 217.6 |
| 7 | 23.9 | 7.5 | 2500 | 2 | 218.6 |
| 8 | 23.9 | 7.5 | 2500 | 2 | 218.6 |
| 9 | 25.0 | 8.1 | 2500 | 2 | 216.9 |
| 10 | 25.0 | 8.1 | 2500 | 2 | 216.9 |
| 11 | 24.6 | 7.8 | 300 | 1 | 217.6 |
| 12 | 24.6 | 7.2 | 345 | 1 | 217.6 |

TABLE 2

Mole ratios for Exemplary Oligomeric Materials 1-12

| Sample | H12MDI Mole ratio (n) | HEA Mole ratio (m) | PPG4000 Mole ratio (p) | HEA Theoretical Mole ratio |
|---|---|---|---|---|
| 1 | 3.5 | 2.6 | 2 | 3 |
| 2 | 3.7 | 3.09 | 2 | 3.4 |
| 3 | 3.85 | 3.89 | 2 | 3.7 |
| 4 | 4 | 4.02 | 2 | 4 |
| 5 | 4 | 3 | 2 | 4 |
| 6 | 3.5 | 2.5 | 2 | 3 |
| 7 | 3.5 | 2.98 | 2 | 3 |
| 8 | 3.5 | 2.5 | 2 | 3 |
| 9 | 3.7 | 4 | 2 | 3.4 |
| 10 | 3.7 | 4 | 2 | 3.4 |
| 11 | 3.5 | 5 | 2 | 3 |
| 12 | 3.5 | 3.78 | 2 | 3 |

The oligomeric materials were prepared by mixing 4,4′-methylene bis(cyclohexyl isocyanate), dibutyltin dilaurate and 2,6-di-tert-butyl-4 methylphenol, at room temperature, in a 500 mL flask equipped with a thermometer, $CaCl_2$ drying tube, stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic reaction). After the PPG4000 was added, the reaction mixture was heated in an oil bath at about 60° C.-64° C. for about 1-1½ hours. Samples 6, 8, and 9 were subjected to extended heating at 60° C. for 24 hours. At various intervals, samples of the reaction mixture where retrieved for analysis by infrared spectroscopy (FTIR) to monitor the progress of the reaction by determining the concentration of unreacted isocyanate groups based on the intensity of a characteristic isocyanate stretching mode at 2265 $cm^{-1}$. The flask was removed from the oil bath and its contents were allowed to cool to 56-58° C. and addition of supplemental HEA (amounts in addition to those listed in Table 1) was conducted drop wise over 2-5 minutes using an addition funnel. After addition of the supplemental HEA, the flask was returned to the oil bath and its contents were heated at about 60° C.-64° C. for about 1-1½ hours. FTIR analysis was conducted on the reaction mixture and the process was repeated until enough supplemental HEA was added to fully react any unreacted isocyanate groups. Complete reaction of isocyanate groups through addition of HEA may be referred to herein as quenching of the isocyanate groups. The reaction was deemed complete when no appreciable isocyanate stretching intensity was detected in the FTIR measurement. In the case of sample 5, 1.25 g HEA was added in excess of the amount needed to quench the isocyanate groups. The amount of supplemental HEA added to each sample to quench isocyanate groups is listed in Table 3 below.

Table 3 also lists the amount in weight percent (wt %) of the di-adduct compound in the final reaction mixture of each sample. The di-adduct compound corresponds to unreacted H12MDI with isocyanate groups that are end-capped with HEA. As noted hereinabove, the di-adduct compound has the formula HEA~H12MDI~HEA.

The concentration (wt %) of di-adduct compound was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 μm, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 μm, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 μL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in the oligomers prepared in the present disclosure was quantified using the preceding GPC system and technique. A calibration curve was obtained using standard solutions containing known amounts of the di-adduct compound (HEA~H12MDI~HEA) in THF. Standard solutions with di-adduct concentrations of 115.2 μg/g, 462.6 μg/g, 825.1 μg/g, and 4180 μg/g were prepared. (As used herein, the dimension "μg/g" refers to μg of di-adduct per gram of total solution (di-adduct+THF)).

Two 100 μL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)= 0.999564).

The di-adduct concentration in the oligomeric materials prepared herein was determined using the calibration. Samples were prepared by diluting ~0.10 g of oligomeric material in THF to obtain a ~1.5 g test solution. The test solution was run through the GPC instrument and the area of the peak associated with the di-adduct compound was determined. The di-adduct concentration in units of μg/g was obtained from the peak area and the calibration curve, and was converted to wt % by multiplying by the weight (g) of the test solution and dividing by the weight of the sample of oligomeric material before dilution with THF. The wt % of di-adduct compound for the twelve oligomeric materials prepared in this example are reported in Table 3.

TABLE 3

Supplemental HEA Additions and Di-adduct Compound Content

| Sample | Supplemental HEA (g) | Di-adduct Compound (wt %) |
|---|---|---|
| 1 | 0.2 | 2.35 |
| 2 | 1.0 | 3.05 |
| 3 | 3.1 | 3.84 |
| 4 | 3.0 | 4.82 |
| 5 | 1.5 + 1.25 | 2.29 |
| 6 | 0 | 2.95 |
| 7 | 1.5 | 2.45 |
| 8 | 0 | 2.41 |
| 9 | 4.0 | 3.39 |
| 10 | 4.0 | 2.93 |
| 11 | 8.0 | 2.85 |
| 12 | 4.0 | 3.38 |

The measured value of the di-adduct compound in each of the oligomeric materials is at least 2.35 wt %. Through variation in the relative mole ratios of H12MDI, HEA, and PPG4000, the present disclosers have produced oligomeric materials that include a polyether urethane compound of the type shown in molecular formula (IV) hereinabove and an enhanced concentration of di-adduct compound of the type shown in molecular formula (V) hereinabove. As described more fully hereinbelow, coatings formed using oligomeric materials that contain the di-adduct compound in amounts of at least 2.35 wt % may have significantly improved tear strength (relative to coatings formed from polyether urethane acrylate compounds alone or polyether urethane acrylate compounds combined with lesser amounts of di-adduct compound) while maintaining a favorable Young's modulus.

Oligomeric materials corresponding to Samples 1-12 were separately combined with other components to form coating compositions. The amount of each component in the coating composition is listed in Table 4 below. The entry in Table 4 for Oligomeric Material includes the polyether urethane acrylate and di-adduct compound produced in the reaction of this Example. A separate coating composition was made for each of the exemplary oligomeric materials corresponding to Samples 1-12, where the amount of di-adduct compound in the oligomeric material corresponded to the amount listed in Table 3.

TABLE 4

Coating Composition

| Component | Amount |
|---|---|
| Oligomeric Material | 50 wt % |
| Sartomer SR504 | 46.5 wt % |
| V-CAP/RC | 2 wt % |
| Lucirin TPO | 1.5 wt % |
| Irganox 1035 | 1 pph |
| 3-Acryloxypropyl trimethoxysilane | 0.8 pph |
| Pentaerythritol tetrakis(3-mercapto propionate) | 0.032 pph |

Sartomer SR504 is ethoxylated(4)nonylphenol acrylate (available from Sartomer). V-CAP/RC is (available from ISP Technologies). Lucirin TPO is 2,4,6-trimethylbenzoyl) diphenyl phosphine oxide (available from BASF) and functions as a photoinitiator. Irganox 1035 thiodiethylene bis[3-(3,5-di-tert-butyl)-4-hydroxy-phenyl) propionate] (available from BASF) and functions as an antioxidant. 3-acryloxypropyl trimethoxysilane is an adhesion promoter (available from Gelest). Pentaerythritol tetrakis(3-mercaptopropionate) (available from Aldrich) is a strength additive. Young's modulus was measured on films formed by curing the coating compositions. Wet films were cast on silicone release paper with the aid of a draw-down box having a gap thickness of about 0.005". Films were cured with a UV dose of 1.2 J/cm$^2$ (measured over a wavelength range of 225-424 nm by a Light Bug model IL490 from International Light) by a Fusion Systems UV curing apparatus with a 600 W/in D-bulb (50% Power and approximately 12 ft/min belt speed) to yield primary coatings in film form. Cured film thickness was between about 0.0030" and 0.0035".

The films were allowed to age (23° C., 50% relative humidity) for at least 16 hours prior to testing. Film samples were cut to specified dimensions of 12.5 cm×13 mm using a cutting template and a scalpel. Young's modulus, tensile strength at break, and elongation at break were measured on the film samples using a MTS Sintech tensile tester. Young's modulus is defined as the steepest slope of the beginning of the stress-strain curve. Films were tested at an elongation rate of 2.5 cm/min with the initial gauge length of 5.1 cm.

Tear strength ($G_0$) was measured with a MTS Sintech tensile tester. Coatings were casted on glass plates with the aid of a draw-down box having a gap thickness of about 0.005" and then immediately cured under UV irradiation at the dose of 1 J/cm$^2$. Shape and dimensions of cured films were prepared according to the International Standard norm ISO 816 (second edition 1983-12-01) "Determination of tear strength of small test pieces (Delft test pieces)". Films were conditioned at 23° C.±2° C. and 50% relative humidity (RH) for at least 16 hours. The initial gauge length was 5.0 cm and test speed was set at 0.1 mm/min. Three to five specimens of each coating were tested. Tear strength ($G_0$) is calculated as follows:

$$G_0 = \frac{\left(\frac{F_{break}}{B \cdot d} \cdot C \cdot \sqrt{\pi \frac{b}{2}}\right)^2}{E}$$

where $F_{break}$ is the force at break, b is the slit length, d is the thickness, B is the width of the test piece. E is the segment modulus calculated from the stresses at elongation of 0.05% and 2%, and C is the sample geometry defined as follows:

$$C = \sqrt{\frac{1}{\cos\left(\frac{\pi b}{2B}\right)}}$$

The Young's modulus and tear strength results for film samples prepared by curing each of the twelve coating compositions are summarized in Table 5. Table 5 also repeats the content of the di-adduct compound present in the oligomeric materials used for each coating composition. The results shown in Table 5 indicate that modification of the oligomeric material to increase the concentration of di-adduct compound leads to a pronounced increase in tear strength. The present disclosure demonstrates that the concentration of di-adduct compound influences the tear strength of fiber coatings while preserving the low values of Young's modulus desirable for primary fiber coatings.

TABLE 5

Young's Modulus and Tear Strength

| Sample | Young's Modulus (MPa) | Tear Strength (J/m²) | Di-adduct Compound (wt %) |
| --- | --- | --- | --- |
| 1 | 0.46 | 16.8 | 2.35 |
| 2 | 0.54 | 20.5 | 3.06 |
| 3 | 0.59 | 22.8 | 3.84 |
| 4 | 0.72 | 26.5 | 4.82 |
| 5 | 0.48 | 20.0 | 2.29 |
| 6 | 0.55 | 23.4 | 2.95 |
| 7 | 0.46 | 21.0 | 2.45 |
| 8 | 0.50 | 23.7 | 2.41 |
| 9 | 0.55 | 27.0 | 3.39 |
| 10 | 0.51 | 26.1 | 2.93 |
| 11 | 0.52 | 21.8 | 2.85 |
| 12 | 0.55 | 22.9 | 3.38 |

Figure 4:
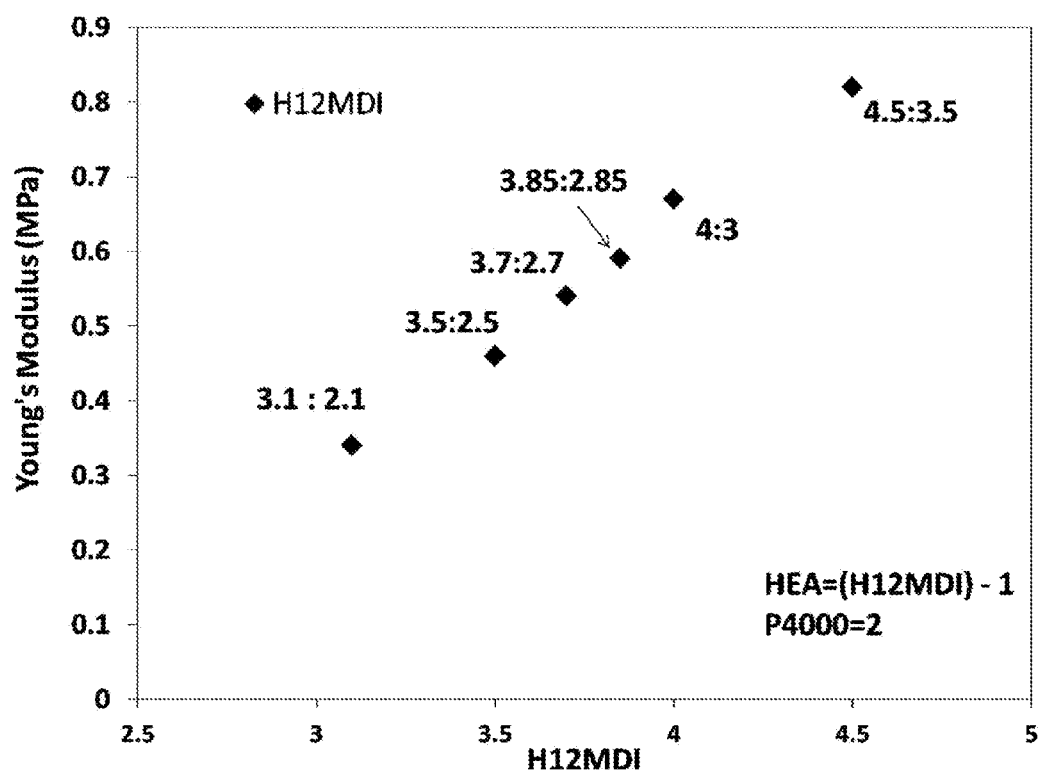
FIG. 4 is a plot showing the dependence of Young's modulus on the mole ratio n of H12MDI in the coating composition. The mole ratios of HEA and PPG4000 included in the oligomeric material used in the coating composition were n−1 and 2, respectively. Supplemental HEA was added to the oligomeric material to quench residual isocyanate groups.

FIG. 4 is a plot showing the dependence of Young's modulus on the molar ratio n of H12MDI used in the synthesis of the oligomeric material of the coating composition. The molar ratios of HEA and PPG4000 used in the initial reaction mixture during synthesis of the oligomeric material of the coating compositions were n−1 and 2, respectively. As indicated in Table 3, supplemental HEA added to the reaction mixture to quench residual isocyanate present in the oligomer. Data are shown for Samples 1-4 (data points with molar ratios labeled as 3.5:2.5, 3.7:2.7, 3.85:2.85, and 4:3) and two related samples (data points with molar ratios labeled as 3.1:2.1 and 4.5:3.5). The Young's modulus was observed to increase with increasing value of the molar ratio n used in the synthesis of the oligomeric material of the coating composition.

Figure 5:
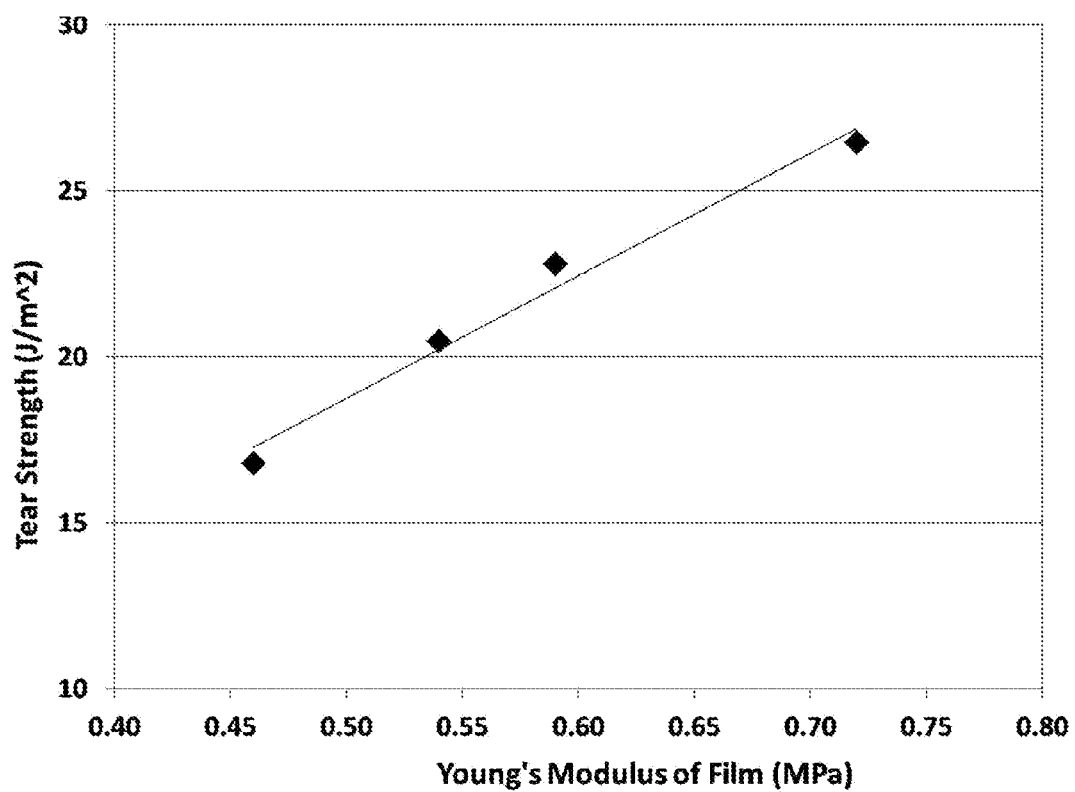
FIG. 5 is a plot showing the dependence of tear strength on the mole ratio n of H12MDI in the coating composition. The mole ratios of HEA and PPG4000 included in the oligomeric material used in the coating composition were n−1 and 2, respectively. Supplemental HEA was added to the oligomeric material to quench residual isocyanate groups.

FIG. 5 is a plot showing the dependence of tear strength on the molar ratio n of H12MDI used in the synthesis of the oligomeric material of the coating composition. The mole ratios of HEA and PPG4000 reacted in the initial reaction mixture were n−1 and 2, respectively with supplemental HEA (beyond the amount represented by molar ratio n−1) being added to the reaction mixture as indicated in Table 3 to quench residual isocyanate groups. Data in FIG. 5 are shown for Samples 1-4 in order of increasing value of n. The tear strength was observed to increase with increasing value of the molar ratio n used in the synthesis of the oligomeric material used in the coating composition.

The oligomeric materials of Samples 1-4 were prepared with ratios of H12MDI:HEA:polyol in the initial reaction mixture ranging between 3.5:2.5:2 and 4:3:2. Supplemental HEA in the amounts indicated in Table 3 was subsequently added to quench residual isocyanate groups present in the reaction composition. It was observed that for a constant molar ratio value of polyol of p=2, the Young's Modulus of the cured coating configured as a film increased from 0.46 MPa to 0.72 MPa as the molar ratio n of H12MDI increased from 3.5 to 4 (FIG. 4). A similar increase in tear strength with increasing in molar ratio was also observed (FIG. 5), with the tear strength increasing from 17.8 J/m² to 26.5 J/m² with an increase in the molar ratio n of H12MDI from 3.5 to 4.

Samples 1-5 were made with HEA having a water content of about 345 ppm, while Samples 6-10 were made with HEA having a water content of about 2500 ppm. For samples with a H12MDI molar ratio value n of 3.5 (Samples 6 and 8), extended heating at 60° C. for about 24 hours was sufficient to quench isocyanate groups (as assessed by the intensity of the IR stretching mode described hereinabove) and no supplemental HEA was needed. High tear strengths (>23 J/cm²) were also observed for both of Samples 6 and 8 (despite the difference in polyol reactant). In Sample 7, no extended heating was employed and supplemental HEA was required to quench residual isocyanate groups after the initial heating at 60-64° C. for 1-1.5 hours. The coating formed from the oligomeric material of Sample 7 had a tear strength of about 21 J/cm². For Sample 9, which had a higher H12MDI molar ratio (n=3.7) than Sample 6 and 8, supplemental HEA was required to quench isocyanate groups despite extended heating at 60° C. for 24 hours. The coating made from the oligomeric material of Sample 9 yielded a very high tear strength (almost 27 J/m²). Sample 10 was prepared similar to Sample 9, but was not subjected to extended heating after the initial heating at 60-64° C. for 1-1.5 hours and required about the same amount of supplemental HEA as Sample 9 to quench isocyanate groups. The tear strength of the coating made from the oligomeric material of Sample 10 had a tear strength of 26.10 J/m².

Samples 11-12 were prepared using a polyol with a higher fraction of lower molecular weight material. It was observed that use of the polyol with higher fraction of lower molecular weight material resulted in coatings with a tear strength of about 22 J/m² or higher, which is much higher than the tear strength of a coating made from a coating composition using an oligomeric material made with a polyol with a smaller fraction of lower molecular weight material (e.g. Sample 1).

Further tests were completed to assess the prevalence of defect formation in coatings formed from the oligomeric materials of this example in fiber drawing, testing, and screening. No discernible defect formation was observed to occur for coatings having tear strength greater than 20 J/m². Table 6 below shows the defect performance of coatings with different tear strength when screen tested and proof tested at 100 kpsi or 200 kpsi and rescreened at 200 kpsi. In order to screen or proof-test optical fiber to a given tensile stress (eg. 100 kpsi or 200 kpsi) a stress is applied to the glass between two belted capstan assemblies. Capstan assemblies consist of a capstan and a pinch belt. The pinch belts on each assembly are used to apply a compressive load on the fiber. This compressive load isolates the proof-test tension in the fiber section between the two belted capstan assemblies from the payout and winding tensions. As each pinch belt is pressed against its corresponding capstan, it imparts additional stresses to the coatings. In particular, a uniform lateral squish load from the pinch belt compression and a shear load, which depends on the stick/slip conditions at the coating-pinch belt and coating-capstan interfaces and results from the glass pulling against the coatings from within the fiber. It is important that the coating can be subjected to this process without creating defects.

TABLE 6

Coating Defect Formation during Screen Testing and Proof Testing

| Tear Strength (J/m²) | Young's Modulus (MPa) | Defects @ 100 kpsi | Defects @ 200 kpsi | Defects @ 200 kpsi Rescreen |
|---|---|---|---|---|
| 14 | 0.42 | yes | | |
| 17-18 | 0.48 | no | | yes |
| 19 | 0.53 | no | yes | |
| 20 | 0.49 | no | 5.6% | |
| 20 | 0.49 | no | | |
| 21 | 0.62 | | | 50% |
| 21 | 0.49 | no | 3% | |
| 21 | 0.49 | | | 70.6% |
| 21 | 0.49 | no | no | 100% |
| 21.5 | 0.74 | no | | no |
| 22 | 0.48 | | | 40% |
| 22 | 0.59 | no | | 54.2% |
| 23 | 0.6 | | | 75% |
| 23 | 0.6 | no | | no |
| 24 | 0.64 | no | no | no |
| 26 | 0.52 | | | no |

Coatings with higher tear strength form fewer defects under different testing conditions.

In Sample 5, an oligomeric material with the molar ratios H12MDI:HEA:polyol=3.5:2.5:2 was made in a manner similar to Sample 1 with the further inclusion of excess HEA (1.25 g (90% excess)) beyond the supplemental HEA (1.5 g) needed to quench isocyanate groups. Comparing Samples 1 and 5, it was observed that the 90% excess HEA resulted in an increase of tear strength from 16.78 J/m² to 19.99 J/m².

Conclusions drawn from the data include: (i) use of HEA with high water content in the synthesis of the oligomeric material may increase the tear strength of the coating (e.g. compare Samples 1 and 7); (ii) for n=3.5, when the oligomeric material was exposed to extended heating (24 hrs at 60° C.), the water present in the HEA of the initial reaction mixture was enough to quench the isocyanate groups and no supplemental HEA was required (e.g. Samples 6 and 8); (iii) for n=3.5, supplemental HEA was needed to quench isocyanate groups when the oligomeric material was not exposed to extended heating (e.g. Sample 7); (iv) for n=3.5, the tear strength of coatings formed with oligomeric materials subjected to extended heating was higher than the tear strength of coatings formed with an oligomeric material not subject to extended heating (e.g. compare Samples 6 and 8 with Sample 7); (v) for n=3.7, supplemental HEA was needed to quench isocyanate groups whether or not extended heating was completed (e.g. compare Samples 9 and 10); and (vi) for n=3.7, the tear strength was similar for coatings made with oligomeric materials with and without extended heating (e.g. compare Samples 9 and 10).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A composition comprising an oligomeric material comprising a polyether urethane acrylate compound having the molecular formula:

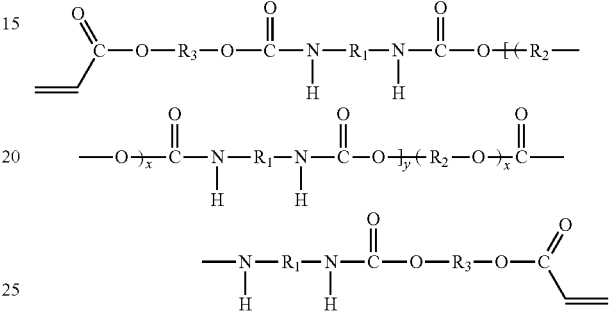

and a di-adduct compound having the molecular formula:

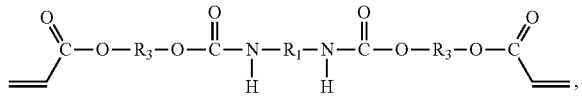

wherein
$R_1$, $R_2$ and $R_3$ are independently selected from linear alkyl groups, branched alkyl groups, or cyclic alkyl groups;
y is 1, 2, 3, or 4;
x is between 40 and 100; and
said di-adduct compound is present in an amount of at least 2.35 wt %.

2. The composition of claim 1, wherein $R_1$ comprises a 4,4'-methylenebis(cyclohexyl) group, $R_2$ comprises a propylene group and $R_3$ comprises a linear alkyl group.

3. The compositions of claim 1, wherein said di-adduct compound is present in an amount of at least 2.6 wt %.

4. The composition of claim 1, further comprising:
one or more monomers with a radiation-curable group; and one or more photoinitiators.

5. The fiber coating composition of claim 4, wherein $R_1$ is a 4,4'-methylene bis(cyclohexyl) group, $R_2$ is a propylene group, $R_3$ is a linear alkyl group, y is 1, and x is between 60 and 80.

6. The fiber coating composition of claim 4, wherein said di-adduct compound is present in said oligomeric material in an amount of at least 2.6 wt %.

7. The fiber coating composition of claim 4, wherein said fiber coating composition includes said oligomeric material in an amount ranging from 35 wt % to 65 wt %.

8. A cured product formed from a coating composition, wherein the coating composition comprises:
one or more monomers with a radiation-curable group;
an oligomeric material comprising:
a polyether urethane acrylate compound having the molecular formula:

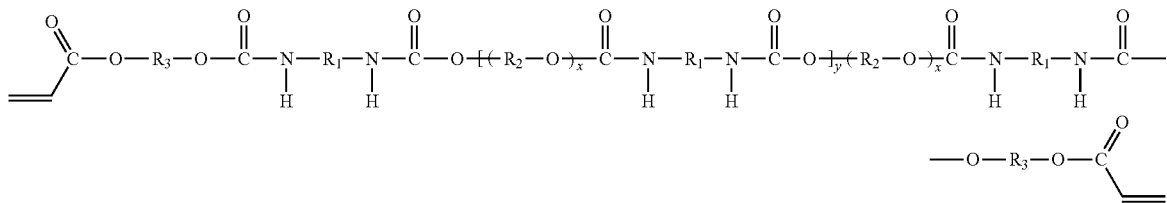

and a di-adduct compound having the molecular formula:

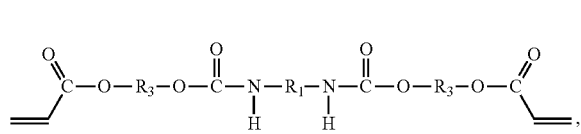

wherein
R$_1$, R$_2$ and R$_3$ are independently selected from linear alkyl groups, branched alkyl groups, or cyclic alkyl groups;
y is 1, 2, 3, or 4;
x is between 40 and 100; and
said di-adduct compound is present in an amount of at least 2.35 wt %;
and one or more photoinitiators.

9. The cured product of claim 8, wherein said cured product has a Young's modulus of less than 0.8 MPa.

10. The cured product of claim 8, wherein said cured product has a Young's modulus less than 0.8 MPa and a tear strength of at least 20 J/m$^2$.

11. An optical fiber comprising a glass waveguide and a coating, said coating surrounding said glass waveguide and comprising the cured product of claim 8, wherein said fiber is able to withstand screening at a level of at least 200 kpsi or two or more screenings of at least 100 kpsi without formation of defects in said cured product.

12. A method of making a composition comprising:
reacting a diisocyanate compound with a hydroxy acrylate compound and a polyol compound, said diisocyanate compound having the molecular formula

O=C=N—R$_1$—N=C=O said hydroxy acrylate compound having the molecular formula

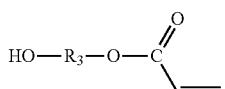

and said polyol compound having the molecular formula

H—O—(R$_2$—O)$_x$—H, said reacting forming a composition comprising a polyether urethane acrylate compound and a di-adduct compound, said polyether urethane acrylate compound having a molecular formula

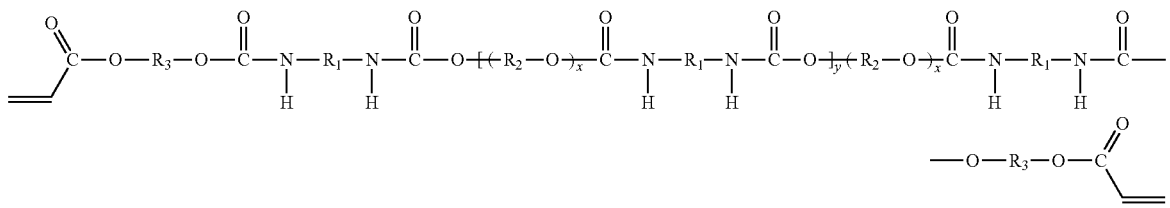

and said di-adduct compound having the molecular formula:

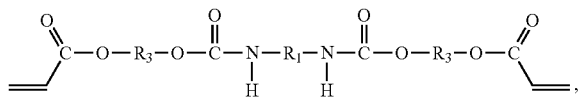

wherein
R$_1$, R$_2$ and R$_3$ are independently selected from linear alkyl groups, branched alkyl groups, or cyclic alkyl groups;
y is 1, 2, 3, or 4;
x is between 40 and 100;
said di-adduct compound is present in an amount of at least 2.35 wt %; and
said diisocyanate compound, said hydroxy acrylate compound and said polyol compound are provided in the molar ratio n:m:p, respectively, where n is 3.0 or greater, m is between n−1 and 2n−4, and p is 2.

13. The method of claim 12, wherein said di-adduct compound is present in said composition in an amount of at least 2.6 wt %.

14. The method of claim 12, wherein said diisocyanate compound is

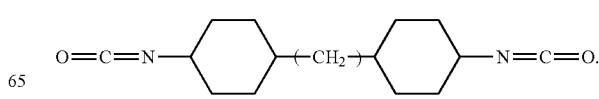

15. The method of claim 14, wherein said polyol compound is polypropylene glycol, said polypropylene glycol has a number average molecular weight in the range from 3000 g/mol to 5000 g/mol and said, hydroxy acrylate compound is 2-hydroxyethyl acrylate.

16. The method of claim 12, wherein n is less than or equal to 4.0.

17. The method of claim 12, wherein said composition further includes-a polyether urethane isocyanate compound having the molecular formula:

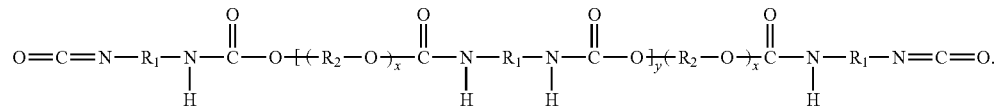

18. The method of claim 17, wherein after reacting said diisocyanate compound with said hydroxy acrylate compound and said polyol compound, said composition comprises unreacted isocyanate groups, said unreacted isocyanate groups being present in said diisocyanate compound or said polyether urethane isocyanate compound, said method further comprising providing a supplemental amount of said hydroxy acrylate compound to said composition, said supplemental hydroxy acrylate compound reacting with said unreacted isocyanate groups.

19. The method of claim 18, wherein said supplemental amount of said hydroxy acrylate compound is sufficient to react with essentially all of said unreacted isocyanate groups.

20. The method of claim 18, wherein said reacting of said diisocyanate compound with said hydroxy acrylate compound and said polyol compound depletes said hydroxy acrylate compound to provide said composition comprising said unreacted isocyanate groups and said supplemental amount of hydroxy acrylate compound is provided after said reacting.

21. The method of claim 12, wherein said diisocyanate compound and said polyol compound are combined in the absence of said hydroxy acrylate compound, said diisocyanate compound and said polyol compound reacting to form a polyether urethane isocyanate compound having the molecular formula:

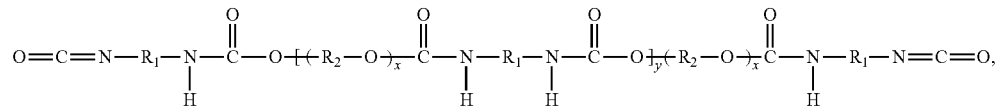

said method further including adding said hydroxy acrylate compound to said polyether urethane isocyanate compound, said hydroxy acrylate compound reacting with said polyether urethane isocyanate compound to form said polyether urethane acrylate compound.

* * * * *

UNITED STATES PATENT AND TRADEMARK OFFICE
CERTIFICATE OF CORRECTION

PATENT NO.          : 9,810,838 B2
APPLICATION NO.     : 14/461685
DATED               : November 7, 2017
INVENTOR(S)         : Yangbin Chen et al.

Page 1 of 1

It is certified that error appears in the above-identified patent and that said Letters Patent is hereby corrected as shown below:

In the Claims

Column 30, Line 47, Claim 3, delete "compositions" and insert -- composition --, therefor.

Column 33, Line 4, Claim 15, delete "mol and said, hydroxy acrylate" and insert -- mol, and said hydroxy acrylate --, therefor.

Column 34, Line 4, Claim 17, delete "includes-a" and insert -- includes a --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*